(12) United States Patent
Martensson et al.

(10) Patent No.: US 6,418,683 B1
(45) Date of Patent: *Jul. 16, 2002

(54) FLOORING PANEL OR WALL PANEL AND USE THEREOF

(75) Inventors: Goran Martensson, Klagstorp; Magnus Kulik, Vellinge, both of (SE)

(73) Assignee: Perstorp Flooring AB, Trelleborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/637,114

(22) Filed: Aug. 11, 2000

Related U.S. Application Data

(63) Continuation-in-part of application No. 08/894,966, filed as application No. PCT/SE96/00256 on Feb. 29, 1996, now Pat. No. 6,101,778.

(30) Foreign Application Priority Data

Mar. 7, 1995 (SE) .............................. 9500810-8

(51) Int. Cl.$^7$ ................................ E04B 1/38
(52) U.S. Cl. .................... 52/282.1; 52/591.1; 52/592.2; 52/582.1; 52/586.1; 52/591.3; 52/591.4; 52/592.1; 403/381; 403/364
(58) Field of Search ............... 52/578, 403.1, 52/594, 592.1; 403/381, 364

(56) References Cited

U.S. PATENT DOCUMENTS

| | | | |
|---|---|---|---|
| 2,004,193 A | * | 6/1935 | Cherry .................. 52/592.1 X |
| 3,535,844 A | * | 10/1970 | Glaros ....................... 52/592.1 |
| 3,807,113 A | * | 4/1974 | Turner ................... 52/592.2 X |
| 4,426,820 A | | 1/1984 | Terbrack et al. |
| 4,940,503 A | | 7/1990 | Lindgren et al. |
| 5,216,861 A | | 6/1993 | Meyerson |
| 5,295,341 A | | 3/1994 | Kajiwara |
| 5,325,649 A | * | 7/1994 | Kajiwara ................... 52/586.1 |
| 5,344,700 A | * | 9/1994 | McGath et al. ........ 52/586.1 X |
| 5,348,778 A | * | 9/1994 | Knipp et al. ............... 428/35.8 |
| 5,502,939 A | * | 4/1996 | Zadok et al. .......... 52/592.1 X |
| 5,630,304 A | | 5/1997 | Austin |
| 5,706,621 A | | 1/1998 | Pervan |
| 5,860,267 A | | 1/1999 | Pervan |
| 6,006,486 A | * | 12/1999 | Moriau et al. ............. 52/589.1 |
| 6,023,907 A | | 2/2000 | Pervan |
| 6,101,778 A | * | 8/2000 | Martensson ................ 52/582.1 |
| 6,182,410 B1 | | 2/2001 | Pervan |

FOREIGN PATENT DOCUMENTS

| | | |
|---|---|---|
| BE | 557844 | 3/1960 |
| CA | 1169106 | 6/1984 |
| DE | 3343601 | 6/1985 |
| GB | 812671 | 4/1959 |
| GB | 1430423 | 3/1976 |
| GB | 2256023 | 11/1992 |
| JP | 3169967 | 7/1991 |

* cited by examiner

*Primary Examiner*—Carl D. Friedman
*Assistant Examiner*—Chi Nguyen
(74) *Attorney, Agent, or Firm*—Stevens, Davis, Miller & Mosher, L.L.P.

(57) ABSTRACT

A building panel, such as a flooring panel or wall panel and a method of assembling the same into a floor, wall cladding, etc. The panel is provided with a locking means in the form of groove (6) and tongue (7) forming a tongue/groove joint for assembling of the panels. In a preferred embodiment, the groove (6) and the tongue (7) are made of water resistant material and formed with a snap-together joint.

19 Claims, 2 Drawing Sheets

FLOORING PANEL OR WALL PANEL AND USE THEREOF

CROSS REFERENCE TO RELATED APPLICATIONS

This application is a continuation-in-part of U.S. Ser. No. 08/894,966, filed Aug. 28, 1997, now U.S. Pat. No. 6,101, 778, the entire disclosure of which is herein incorporated by reference. Application Ser. No. 08/894,966 is a PCT National Phase Application filed under 35 USC 371, and therefore claimed priority from PCT Application Number PCT/SE96/00256, which was filed on Feb. 29, 1996. PCT Application Number PCT/SE96/00256 claimed priority based upon Swedish Application Number 9500810-8, filed on Mar. 7, 1995.

BACKGROUND OF THE INVENTION

1. Field of the Invention

The present invention relates to a building panel, such as a flooring panel or wall panel and the use thereof to form floors, walls, cladding, etc., by assembling a plurality of the panels. In one embodiment, the panels have particular utility for flooring or cladding a wet room.

2. Description of the Related Art

During the last few years laminated floors have achieved and increased in popularity and on many markets they are beginning to replace parquet floors and wall-to-wall carpets. In the production of laminated floors a decorative thermosetting laminate is first produced. This laminate usually consists of a base layer of paper sheets impregnated with phenol-formaldehyde resin and a decorative surface layer comprising a decor paper sheet impregnated with melamine-formaldehyde resin. The laminate is produced by pressing the different layers at a high pressure and at an increased temperature.

The laminate thus obtained is then glued to a carrier of particle board, for instance, or used as such without any carrier and it is then called compact laminate. The laminated panel thus produced is then sawn up to a number of floor boards which are provided with groove and tongue at the long sides and the short sides thereof. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance.

At the assemblage of such a flooring, glue is normally applied in the groove when the floor boards are assembled. Therefore, it will be difficult to change a damaged board or to remove a whole flooring and, for instance, install it in another room.

To avoid the above problem efforts have been made to achieve floor boards which can be assembled without glue. One such construction is disclosed in the U.S. Pat. No. 5,295,341. There the boards are provided with groove and tongue in the usual way, but here a snap-together system is included in the groove-tongue joint.

These floor boards can be assembled without glue. However, they have the disadvantage that the joints between the boards will be flexible and not rigid. Moreover, the joint between adjacent boards is not tight. This means that if the surface below the floor boards is not completely even, which is usually the case, a gap will be formed between the boards. Into these gaps dirt and water can penetrate.

SUMMARY OF THE INVENTION

According to the present invention, the last mentioned problem has been solved and a building panel, such as a flooring panel or wall panel, preferably of thermosetting laminate having two pairs of parallel side edges has been brought about. Two of these side edges are provided with a locking means in the form of a groove and the other two are provided with a tongue fitting in the groove whereby a tongue/groove joint for assembling of the panels is formed. The groove and the tongue are made of a water resistant or water tight material and formed with a snap-together joint including one or more snapping webs or the like with corresponding cooperating snapping grooves. In one embodiment, the groove in front of the snap-together joint has an entrance opening and continues inside the snap-together joint into a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained. In other embodiments, where the effect provided by the stabilizing groove and stabilizing part is not desired, these stabilizing parts can be omitted.

According to one preferred embodiment two adjacent side edges of the panel are provided with a groove and the other two side edges with a tongue. In this embodiment, the panel is usually quadrilateral, such as rectangular, but it can also be square.

In square panels it is also possible to provide a pair of parallel sides with a groove and the other pair with a tongue. However, the choice of pattern on the surface layer of the panel is limited with this shape. In other embodiments, the perimeter of the panel comprises three or five, or more, such as six or eight, side edges and the arrangement of the grooves and tongues can be varied. The series of panels which are connected to form a floor, wall, or other system need not all be of the same shape.

It is preferred that the groove and the tongue are made of a water proof or water resistant material, such as a thermoplastic, a thermosetting laminate, aluminum or a cellulosic product such as a wood fiber board, chipboard or particle board or a veneer impregnated or coated with a waterproofing material, such as oil, wax or a thermoplastic or thermosetting substance including, but not limited to, polymeric resins. It has been found that treating the panel with a liquid plastic substance such as a polyurethane gives excellent results. Of course, also other waterproof, water tight or water resistant materials can be used.

In another embodiment, the groove, as well as the tongue, are formed as a ledge fixed to the side edges of the panel. Suitably the ledge-formed groove and tongue respectively are then fixed in a recess along the side edges with glue, for instance. Alternatively, the integral tongue and groove portions of the panels can be formed in either the base material, the laminate material and/or both.

Protrusions which form the snapping webs can be formed on the upper and/or lower side of the tongue while cooperating depressions which form the snapping grooves are formed in the groove.

In one preferred embodiment one snapping web is formed on the upper side of the tongue and one on the lower side thereof while the groove has two fitting snapping grooves one at the top and one at the bottom of the groove. These snapping webs may be diametrically opposite one another or offset from one another. The corresponding snapping grooves will be positioned according to the position of the snapping webs so as to cooperate therewith. In an alternative, but equally preferred embodiment, the tongue may be provided with an uneven number of snapping webs on the upper and lower side of the tongues, e.g., none above and one below, one above and two below, etc.

If necessary one pair of snapping webs can be formed on the upper side of the tongue and one pair on the lower side thereof. Of course, you then need two snapping grooves at the top and two snapping grooves at the bottom of the groove to fit with the snapping webs. This construction will give an extremely strong joint.

Of course, in all these embodiments, the snapping webs can be arranged in the groove and the snapping grooves on the tongue. A greater number of snapping webs may also be positioned above the tongue than below the tongue without departing from the invention.

In the preferred embodiment using the stabilizing parts, the width of the stabilizing part is 1–10 mm, preferably 2–10 mm, most preferably 4–10 mm. Generally, a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels. Of course, without any substantial gap between the panels, water and dirt are prevented from entering the assembled panels, flooring or wall covering.

As a safeguard against water penetration a seal might be arranged in the inner part of the stabilizing groove for instance. Alternatively, by selectively engineering the materials used in the tongue and/or groove portions of the panel of water resistant or water proof materials of suitable geometry and elastic modulus, the snapping action can be facilitated by permitting displacement or flexing of the elements defining the tongue and/or groove while the resilience permits snapping of the locking feature to bring said panels into forming a tight joint such that the joint is said to be waterproof or water tight. A joint is water tight when standing water will not penetrate the joint for several hours.

Notwithstanding that the joint is tight to the point of being waterproof or water tight, the panels may be dismountable from each other after snapping the panels together.

Preferably the grooves and the tongues run the full length of the side edges of the panels, although they may be intermittently interrupted along the length of the panels.

The panels can be designed in such a manner that the underside of the groove and/or the tongue are situated in the same level as the underside of the panel.

The panels can be used for covering floors and walls in ordinary dry rooms. However, due to the tight joints and in other cases due to the rigid and water tight joints, the panels can be used also for wet rooms. For such applications the whole panel is preferably made of plastic or thermosetting laminate of so-called compact laminate type. Such a laminate does not absorb water.

Another alternative is a water resistant and/or non water-absorbing base with a water tight surface. The surface may, for instance, consist of a paint, a thermoplastic foil such as polyethylene, polypropylene or polyvinyl chloride, a paper sheet impregnated with a resin, such as a thermosetting or UV-curing resin such as one comprising acrylate and a maleimide, or of a thermosetting laminate.

One suitable non water-absorbing base is a board produced by pressing and consolidating wood particles or wood chips impregnated with a thermoplastic.

The invention will be further explained in connection with the enclosed figures.

DETAILED DESCRIPTION OF THE PREFERRED EMBODIMENTS

The panel 1 consists of a base of cellulosic materials, such as wood particles impregnated with a resin, such as a thermoplastic material, with a decorative thermosetting laminate as a surface layer 17 glued on top.

Figure 1:
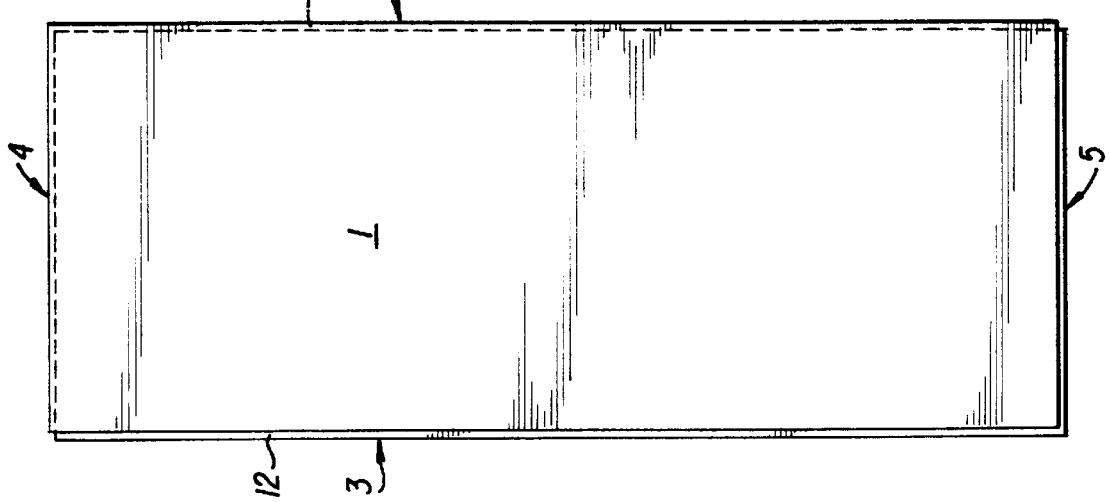
FIG. 1 schematically shows a panel 1 according to the invention seen from above. The panel is drawn as a rectangular shape but it can just as well be square or other quadrilateral.

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap together joint. In the embodiment shown in FIG. 2, the snap-together joint consists of two snapping webs 9, one on the upper side of the tongue 7 and one on the lower side of tongue, these webs 9 cooperating with two fitting snapping grooves 10.

In front of the snap-together joint, which means the snapping webs 9 and the snapping groove 10, the groove 6 has an entrance opening 8. Inside the snap-together joint the groove 6 continues in a stabilizing groove 13.

The tongue 7 is formed with a rear neck 11 intended to fit in the entrance opening 8 of the groove 6. In front of the snap-together joint the tongue 7 has a forwardly protruding stabilizing part 12 intended for a tight fit in the stabilizing groove 13.

The parts 9 and 10 included in the snap-together joint are also adapted to each other to give a tight fit and strong joint. To increase this effect further the snapping grooves 10 are provided with undercut edges 18 which cooperate with the backside of the snapping webs 9 with the same undercut.

Figure 2:
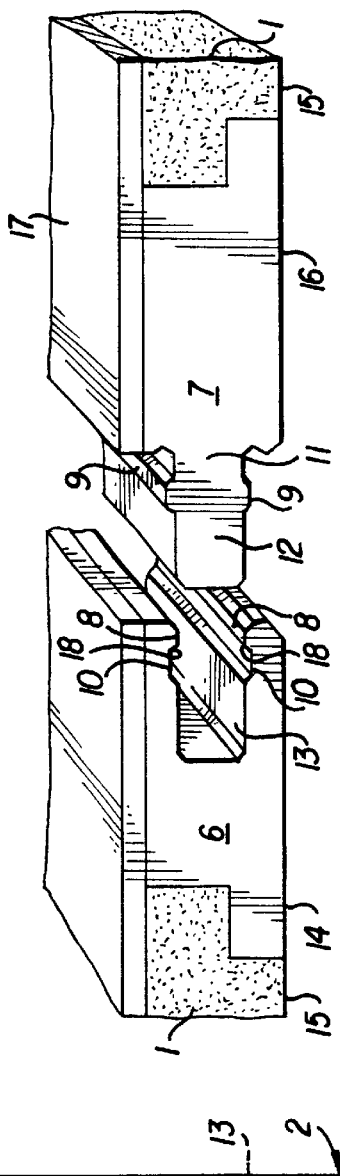
FIGS. 2 and 3 show a cross section through two adjacent edges of two embodiments of a panel where two such panels are to be assembled.
Figure 3:
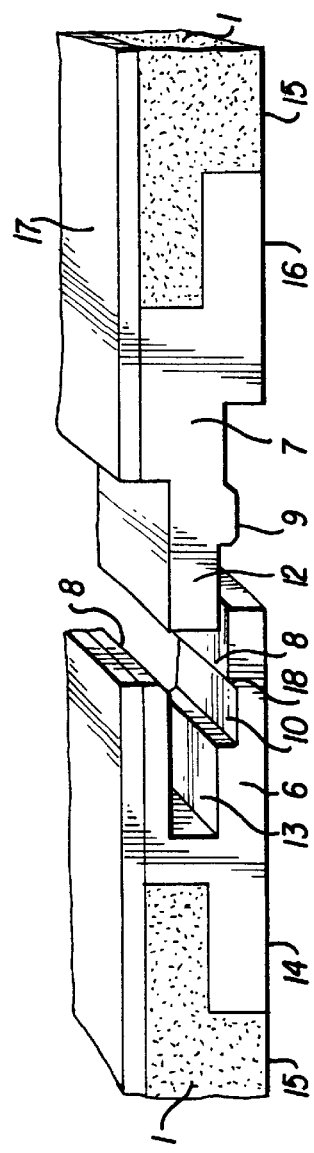

In the embodiment of FIGS. 2 and 3, the groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1. In the embodiments of FIGS. 4–8, the tongue and groove are formed of the same material as the body of the panel. Thus, when the body of the panel comprises a carrier of a resin impregnaeted cellulosic material, such as fiber board, the tongue and groove are formed of the same material as the carrier of the panel. In other embodiments, the base or carrier itself can be formed of a water repellent material, such as plastic. When pushed together, the panels make a distinctive sound, which we have nicknamed the "click" system.

When connecting panels have been assembled by the snap-together joints and the stabilizing parts 12 inserted in the stabilizing grooves 13, the panels are fixed to each other and prevented from unintentional separation. A rigid floor covering or wall covering with water tight joints and without unintentional gaps between the panels is obtained. The usual rotation of the snapping webs 9 in the snapping grooves 10 is prevented by the stabilizing parts 12 in the stabilizing grooves 13. Accordingly these parts are essential for the possibility to get a rigid joint between the panels.

The embodiment shown in FIG. 3 is very similar to that according to FIG. 2. The difference is that only the under side of the tongue 7 is provided with a snapping web 9. The upper side is lacking a snapping web. Accordingly there is only one snapping groove 10 at the bottom of the groove 6.

Figure 4:
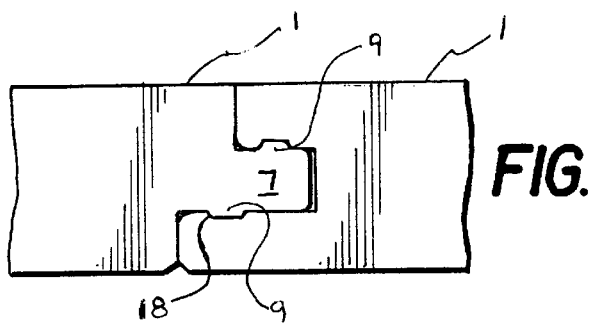
FIG. 4 is a schematic representation of a joint between two panels containing offset snapping webs on the tongue.

The embodiment of FIG. 4, though similar to FIG. 2 in having the upper and lower sides of tongue 7 provided with snapping webs 9, such snapping webs are longitudinal displaced along tongue 7.

Figure 5:
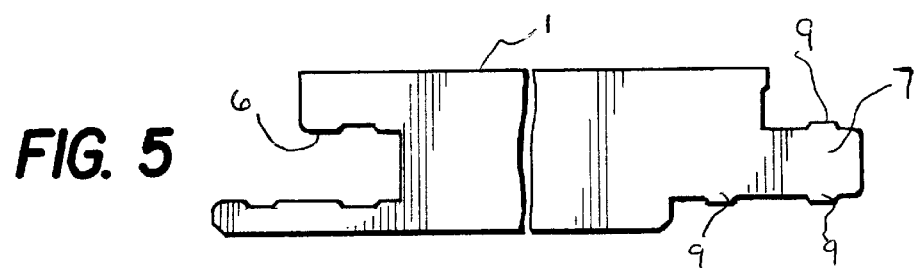
FIGS. 5–7 are schematic representations of three other embodiments showing different placements, number and arrangements of snapping webs and snapping grooves on panels.

The embodiment of FIG. 5 shows the provision of an uneven number of snapping webs 9 on tongue 7 where an upper and lower snapping web are vertically aligned but a third snapping web, positioned on the underside of the tongue 7 is longitudinally displaced at a distance towards the main body of the carrier.

Figure 6:
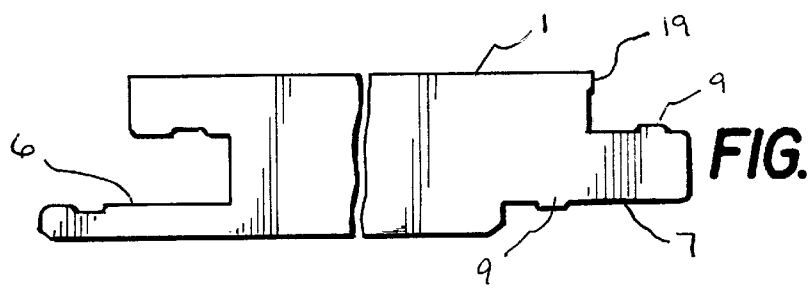

In FIG. 6 is illustrated a further embodiment, similar to that of FIG. 4 in having longitudinally displaced upper and lower snapping webs 9. However, in FIG. 6 is provided a nose 19 on the upper edge of panel 1, proximate the tongue side of the panel. Such nose 19 assists in providing a tight joint when similar panels are assembled together. The nose may alternatively be provided on the groove side of the panel or further on both the tongue and groove sides of the panel.

Figure 7:
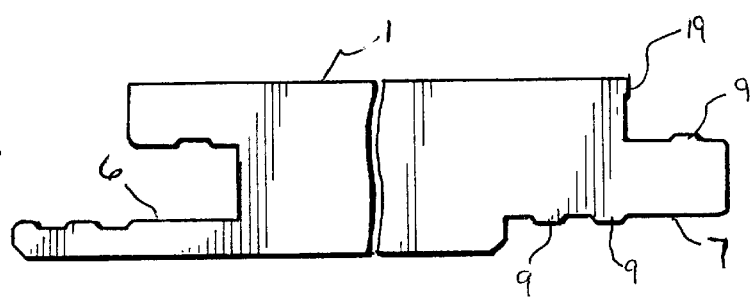

FIG. 7 illustrates the same type of nose 19 as in FIG. 6, however, in this embodiment, the lower snapping webs 9 are both longitudinally displaced towards the main body of panel 1 such that the most distal snapping web 9 lies vertically beneath nose 19 and the other snapping web 9 is inwardly positioned.

Figure 8:
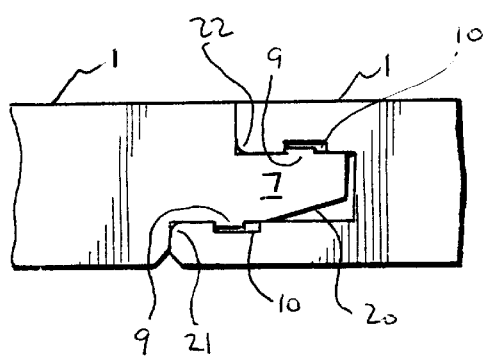
FIG. 8 is a schematic representation of a joint between two assembled panels in another embodiment of the invention.

The embodiment of FIG. 8 illustrates a unique design for both tongue 7 and snapping webs 9 and snapping grooves 10. In this embodiment, tongue 7 is undercut so as to provide a sloping surface 20. Moreover, the walls of the backsides of snapping webs 9 and the corresponding walls of snapping grooves 10 are vertical, or nearly so. This configuration permits at least one of the panels to be tilted relative to the other panel to provide for disassembly of the floor panels. The sloped surface 20 accommodates such tilting and thus, the disassembly of the panels. Moreover, the radius covers 21, 22 of the panels edges facilitate the "turning" of the assembled panels away from each other.

As in the embodiments of FIGS. 2 and 3, each of the embodiments of FIGS. 4–8 may comprise an upper surface of a thermosetting laminate, a plastic foil such as an olefin plastic, paper sheets impregnated with a thermosetting or UV-curing resin comprising acrylate and a maleimide or similar materials.

The body of the panels in the embodiments are intended to be assembled without glue, but certainly glue or other sealing substance could be applied to the vicinity of the joint. Especially in the embodiments where the panels are intended to be installed in or proximate wet rooms, but also in ordinary rooms, the panels, especially the tongue and groove portions, can be coated or impregnated with a waterproofing material, such as an oil, wax, paint or other waterproofing material such as a liquid plastic coating, like polyurethane.

Alternatively, instead of a waterproof or water resistant layer on a carrier, the entire panel body can be made of a waterproof material, such as plastic, in which case the tongue and groove portions may be made of the same material as, and a unitary part of, the panel.

It should be appreciated that we have provided a building panel and method of assembling the same which will result in tight joints between panels such that the assembled panels, used as flooring or cladding will be water repellent, that is, impervious to water standing on the surface of the joint.

The invention is not limited to the embodiments shown and described sine these may be readily modified by those of ordinary skill in the art to which this invention pertains without departing from the scope of the appended claims.

We claim:

1. A method of forming a tight joint between similar panels, said method comprising:

providing a series of panels, each panel defining a perimeter, said perimeter defining at least three sides of said panel, and at least one tongue or groove shape provided along said sides, an uneven number of protrusions being defined on at least one of an upper surface of said tongue or groove to act as a snapping web and a corresponding number of uneven depressions being defined on at least one of said upper surface of said tongue or groove, positioned so as to act as a snapping groove with said snapping web, said snapping web and snapping groove urging the panels together to form a tight joint.

2. The method of claim 1, wherein the panels are quadrilateral and two sides have tongues and two sides have grooves and the panels are assembled by snapping the tongues into said grooves.

3. The method of claim 1, wherein said protrusions are on said tongue and the panels are assembled by snapping said protrusions into depressions in said groove.

4. The method of claim 1, wherein said panels may be disassembled by unlocking at least one of said panels about said joint to dismount said panels.

5. The method of claim 3, wherein the uneven number of protrusions are on said tongue.

6. The method of claim 5, further comprising providing an uneven number of depressions in said groove so as to cooperate with each of said protrusions.

7. A system for forming a wall, floor or cladding by assembling a plurality of panels into an interlocked unit, said system comprising:

a plurality of panels, each of said panels defining a perimeter having at least three sides; each of said sides being provided with at least one of a tongue or groove, said panel comprising an upper surface formed of paint, a thermoplastic foil, a paper impregnated with a thermosetting or UV-curing resin, or thermosetting laminate; at least one of an upper surface of the tongue or groove being provided with an uneven number of protrusions and the other being provided with a corresponding uneven number of depressions cooperating with each said protrusion to form a snapping web and snapping groove, respectively; said snapping web and said snapping groove forcing adjacent panels towards the joint when said panels are snapped together.

8. The system of claim 7, wherein at least one of the panels comprises a nose extending outwardly along an upper surface of the perimeter.

9. The system of claim 7, wherein the panels are quadrilateral.

10. The system of claim 7, wherein the joints formed in said interlocked unit are water resistant.

11. The system of claim 7, wherein the panels are formed of an upper surface adhered to a base layer and the base layer is treated so as to increase its water resistance properties.

12. The system of claim 7, wherein the base layer is formed of a compressed cellulosic impregnated or coated with a wax, an oil, or a resin.

13. A building panel, said panel having a perimeter defining quadrilateral, said sides being provided with at least one of a tongue or a groove, said panel comprising an upper surface formed of a paint, a thermoplastic foil, a paper impregnated with a thermosetting or UV-curing resin or thermosetting laminate; at least one of an upper surface of said tongue or groove being provided with an uneven number of protrusions and the other being provided with a corresponding uneven number of depressions cooperating with each said protrusion to form a snapping web and snapping groove, respectively; said snapping web and snapping groove forcing adjacent panels towards the joint where panels are snapped together.

14. The building panel of claim 13, wherein there are at least three protrusions, two of which are diametrically opposed.

15. The building panel of claim 13, wherein the tongue on which the protrusions are located has a truncated lower surface.

16. The method of claim 1, wherein said uneven number is one.

17. The building panel of claim 13, wherein said uneven number is one.

18. The building panel of claim 13, wherein none of said protrusions are diametrically opposed.

19. The system of claim 7, wherein said uneven number is one.

* * * * *